United States Patent Office 2,751,369
Patented June 19, 1956

2,751,369

PIGMENTED COMPOSITIONS AND METHODS OF MAKING SAME

Theodore A. Te Grotenhuis, Olmsted Falls, Ohio, assignor of twenty per cent to The General Tire and Rubber Company, Akron, Ohio, a corporation of Ohio No Drawing. Application March 30, 1945, Serial No. 585,824

5 Claims. (Cl. 260—41)

The present application is a continuation-in-part of my copending applications Serial No. 372,182, filed December 28, 1940, now Patent No. 2,394,025; Serial No. 471,745, filed January 8, 1943, now Patent No. 2,452,083; and Serial No. 527,929, filed March 24, 1944. The present invention relates to pigmented coating compositions such as printing or lithographic inks, paints, lacquers, etc., and to a method of preparing the same. It particularly relates to a method of facilitating the dispersion of pigments in aqueous or non-aqueous vehicles and to a method of improving the film-forming characteristics of the composition. This application also relates to a method of grinding or preparing solids in finely pulverized form.

It is an object of the present invention to provide a coating composition in which the cohesion between the pigment and the vehicle or the wetting of the pigment particles by the vehicle is enhanced.

It is another object of the present invention to provide a pigmented coating composition comprising an aqueous emulsion of any suitable organic vehicle in which pigment particles contain an organophilic surface, one more readily wetted by said organic vehicle than water, so that a superior union of pigment and film-forming globules is obtained.

It is a further object of the present invention to provide a film-forming coating composition or ink containing a pigment with a surface treatment which facilitates formation of a nonporous film.

It is another object of the present invention to provide a pigment treatment whereby inorganic pigments are rendered more readily wettable by organic solvents.

It is another object to provide a method of grinding solid materials, particularly inorganic solid materials, in a more efficient manner.

It is a further object of the present invention to provide a colored coating composition or ink comprising an organic or an inorganic pigment which tends to remain wetted by organic vehicles in the presence of water.

It is a still further object to provide a pigmented aqueous emulsion of organic film-forming material or ink having the property of producing less porous films.

In accordance with the present invention, I attain the above and other objects by subjecting any of the organic or inorganic pigments to a fluid comprising a reactive organosilicon compound having directly attached to silicon at least one water-hydrolyzable group and at least one carbon atom, preferably removing non-silicon-containing hydrolysis products such as hydrogen chloride formed in the reaction with the pigment, and in the case of coating or coloring compositions incorporating pigments thus treated into the desired vehicle. I prefer an organic silicon halide having the general formula $R_aSiX_{(4-a)}$, where X is selected from halogen groups, preferably chlorine, $a$ is 1 to 3, inclusive, and each of the groups R is selected from organic groups such for example as short or long-chain saturated or unsaturated groups, such as alkyl, alkylenyl, dienyl, haloalkylenyl, aryloxyaryl, alkoxyaryl, alkoxyaliphatic, aryloxyaliphatic, haloalkylene, aryl, aryloxy, alkoxy or mixtures thereof. Compounds selected from the above, having at least one of the organic groups bonded to silicon by a carbon-to-silicon bond, are much more stable and are accordingly preferred.

In the treatment of pigments with organic halosilanes, such as organosilicon halides having 1, 2 or 3 halogens substituted by an organic radical, the chlorine attached to the silicon appears to react with any adherently adsorbed film of moisture or with hydroxy or carboxylic groups attached to the surface of the pigment. The treated pigments have attached to the surface thereof a carbon-silicon group, the carbon atom being attached to said surface thru the silicon atom, thus giving the desired characteristics.

Even organic pigments such as carbon black surprisingly appear to contain groups that are reactive with silicon halides firmly attached to the surface thereof. It is probably these groups which cause the carbon black to be relatively easily wetted by water.

Groups of some sort on the pigment particles are generally desirable to facilitate dispersion in any vehicle as they appear to prevent packing of the particles, so that they become more readily dispersed in fluids. I have observed this fact in the case of carbon black and other pigments. Even though hydrophilic groups such as those containing oxygen, hydroxyl, carboxyl, normally present on the surface of carbon particles, tend to make the carbon particles less easily wetted by organic fluids, they do facilitate the dispersion of carbon black in organic fluids, as evidenced by the fact that carbon treated so as to remove such groups is less readily dispersed. The removal of adsorbed groups probably permits a closer packing of the particles so that they are again separated only with difficulty. Similar observations may be had in the case of dispersion of inorganic pigments.

By treating pigments with one or more organic chlorsilanes or organic silicon halides, I not only provide groups adhered to the surface of pigment particles to facilitate dispersion of the pigment in the organic vehicle, but I make the pigment more readily wetted by the organic vehicle. By utilizing organic groups which can chemically combine or cross-link the organic vehicle with the treated pigment or treated fabric to be incorporated, I frequently obtain a chemical bond between the pigment and the organic vehicle or solid in which it is incorporated. In case the pigment is incorporated in aqueous dispersions (especially oil-in-water type emulsions) of an organic fluid, pigments treated with hydrocarbon-substituted silicon chlorides tend to flush into the organic liquids rather than remain in the aqueous phase. Even the tendency of certain pigments to remain at the oil-in-water interface is thus greatly decreased.

The advantage of utilizing a pigmented aqueous emulsion of natural or synthetic resins, or an emulsion of a solution of such resins, has long been apparent to manufacturers of inks and coating compositions. In such compositions the hydrophilic pigments are in the aqueous phase and, not being readily wettable by many organic materials, tend to prevent full union of the separate globules of resin during drying, with the result that the films are frequently much more porous than desired. With pigments treated in accordance with the present invention, any treated pigment outside the globules of organic resin solutions in the drying film tends to cause the globules to coalesce and, therefore, facilitates formation of a more impervious film.

In the separation of solids by grinding a clinker or a mass of material to the pulvert or powdery state (especially after a previous treatment of the clinker or solid with a very small amount of steam or water vapor), the solid, liquid or vapor of a reactive organosilicon compound such as one or more of the organochlorsilanes or even organo-orthosilicates may be simply admitted to the atmosphere of the grinder, whereupon they assist in maintaining the particles of pigment separate and distinct and thus increase the grinding efficiency or speed required to grind pigments, especially inorganic pigments, including hydraulic cements, to a given fineness.

The preferred organic groups adhered to the pigment through the silicon atom depend largely on the character of the vehicle or organic material in which it is to be alter dispersed. When the vehicle is essentially a hydrocarbon such as a solution of a resin in a petroleum or aromatic hydrocarbon solvent, or a hydrocarbon polymerizable material such as one or more of butadiene, isoprene and styrene, or an emulsion of such essentially hydrocarbon materials, etc., the organic groups or at least some of those in the organo-substituted silicon tetrachloride are preferably hydrocarbon groups, either aromatic, aliphatic or araliphatic. Aliphatic groups of more than one carbon atom exert greater effect per mole on selective wetting by hydrocarbon vehicles than does the methyl group, probably because of their greater covering power. For polymerizable or vulcanizable vehicles such as rubber, or monomers or partial polymers polymerizable to the vulcanizable rubbery state, one or more organic groups containing unsaturated aliphatic carbon-to-carbon linkages are preferred, hydrocarbon groups being preferred for hydrocarbon polymerizable materials, etc.

When the vehicle is a non-hydrocarbon, as for example halogen-containing material such as mono- or polychloroprene, vinyl chloride, vinylidene chloride, ethylene dichloride or a chlorine-containing organic solvent, the pigment is preferably treated with a halo-organic silicon halide of one or more of the above-mentioned classes.

Halogenated organic groups, unsaturated groups and/or ether groups attached to the pigment through a silicon atom are also desirable for pigment grinding or where the pigment is to be used in aqueous vehicles, since such groups are somewhat more hydrophilic than saturated hydrocarbon groups.

The organosilicon halides used in accordance with the present invention may be prepared in any suitable way, as by reaction of an unsaturated hydrocarbon, etc. with silicon tetrachloride in the presence of a Friedel-Crafts catalyst, or by a Grignard or Würtz synthesis reacting the desired organohalide as for example R—Br, where R is the desired organic radical, for example phenyl, alkyl, alkylenyl, alkyldienyl, etc., with silicon tetrachloride or a mono- or diorgano-substituted silicon tetrachloride in the presence of magnesium, etc.

The preparation or properties of suitable organo-substituted silicon halides (organohalo silicones) is set forth in one or more of the following United States patents: Lincoln et al., 2,129,281; Nason, 2,182,208; Rochow, 2,258,218–19–20–21–22; Rochow, 2,286,763; Rochow, 2,352,974; Hyde, 2,371,050; Rochow, 2,371,068.

Examples of suitable organo-substituted silicon halides for the present invention are: the alkyl-substituted silicon chlorides such as mono-, di- and trimethyl, ethyl, propyl, butyl, and lauryl silicon chlorides, etc.; the alkylenyl silicon halides such as mono-, di- and trivinyl, allyl, butenyl and dodecylenyl silicon halides, etc. having two to twenty carbon atoms in at least one organic group; the alkylenyl alkyl silicon chlorides such as allyl dimethyl silicon chloride, diallyl methyl silicon chloride, allyl methyl silicon dichloride, vinyl allyl methyl silicon chloride, diallyl methyl silicon fluoride and allyl dimethyl silicon bromide, etc., having at least one halogen and at least one unsaturated group of two to twenty or more carbon atoms attached to silicon; the aryloxy or alkoxy silicon halides such as ethoxy silicon chloride and ethoxy diethyl silicon chloride; the alkoxy aliphatic-, alkyleneoxy aliphatic-, aryloxy aliphatic-, aryloxyaryl- and aliphatic-oxyaryl silicon halides such as butoxyethyl dimethyl silicon chloride, ethoxymethyl dimethyl silicon chloride, allyloxyethyl dimethyl silicon chloride, allyloxylauryl silicon trichloride, allyloxyphenyl dimethyl silicon chloride and phenoxyphenyl methyl silicon dichloride, etc.; the halogen alkyienyl or haloalkyl silicon halides including chloroethylenyl silicon chloride (chlorvinyl dimethyl silicon chloride), chlorethyl dimethyl silicon chloride and di(chlorallyl)methyl silicon chloride, etc.

While silicon halides having only an alkoxy and/or an aryloxy group linked to silicon give some desirable effects, especially in pigment preparation, etc., the preferred compounds have at least one group with a carbon atom bonded directly to silicon.

PREPARATION OF TREATED PIGMENTS

The following examples illustrate the treatment of pigments with readily hydrolyzable organo-substituted silicon chlorides.

Example 1

100 grams of unbeaded carbon black are subjected to agitation in the presence of a vapor from about one gram of a mixture of mono-, di- and trimethyl silicon chlorides obtainable under the trade-name "Dryfilm" from The General Electric Company. The agitation is continued in the presence of the alkyl silicon halide for about ten minutes to allow thorough penetration of the vapor. The hydrochloric acid formed by the reaction may be removed in any suitable manner, as for example by heating at elevated temperature, by neutralizing with an alkaline material such as dry $NH_3$, by shaking the carbon black with water (washing), or preferably by treating the carbon black with ether and water and washing the carbon black-ether mix until free from acid. The carbon black thus treated has much less tendency to be wet by water and much greater tendency to be wet by hydrocarbon organic solvents.

Example 2

When titanium dioxide is substituted for carbon black in Example 1, and agitation continued in like manner, it is also more readily dispersed in organic liquids.

Example 3

The methyl silicon chloride of Example 1 is substituted by a mixture of allyl dimethyl silicon chloride and methyl diallyl silicon chloride, other conditions being the same except that the pressure of the treating atmosphere is sufficiently reduced and the temperature of the treating atmosphere is sufficiently raised above room temperature to insure presence of the organosilicon chloride in vapor form. The carbon black thus treated is also more selectively wet by organic solvents and in addition contains a chemically attached unsaturated group for chemical union with polymerizable materials and the like.

Example 4

The organosilicon compounds of Example 1 are substituted by 9-10-octadecenyl dimethyl silicon chloride dissolved in anhydrous organic solvent, such as petroleum ether, containing in admixture therewith a small amount of ethyl ether. The carbon black is thoroughly wet by the solution thus formed and, after evaporation of the solvent, is found to have an exceedingly strong affinity for liquid organic hydrocarbons.

The pigments in the above examples may be substituted by other pigments, including zinc oxide, sulfur, finely divided silica, aluminum oxide, inorganic particles having a coating of organic dyes such for example as "Hansa Yellow" and the like. The silicon halide may be substituted by other organosilicon compounds having one to three, inclusive, readily hydrolyzable groups, as set forth above, to obtain pigments having improved dispersion in organic liquids, plastics or solids.

PREPARATION OF RUBBERLIKE COMPOUNDS

The following examples illustrate the preparation of pigmented polymers and rubber compounds in accordance with the present invention.

Example 5

300 grams of carbon black treated with lauryl methyl silicon chloride dissolved in anhydrous ether, washed with water and dried as in Example 4, is ground in a ball mill with about 1,000 parts of water, containing 30 parts of Daxad (a condensation product of naphthalene sulfonic acid and formaldehyde) and sufficient sodium hydroxide to neutralize the HCl contained in the carbon black. The aqueous dispersion thus prepared is mixed with about 1800 parts of a rubber latex containing about 50% of rubber solids, about 5 parts of zinc oxide, and 1 part of sulfur. Films formed from the compounded latex mixture after drying and vulcanization have exceptionally high strength. Also, the latex mixture upon coagulation with or without slight mastication is found to have carbon black in dispersed form, suitable for interaction with the rubber hydrocarbon.

The rubber latex of the above example may be substituted in whole or in part by a latex or other natural or synthetic rubber or resinous polymer, particularly a sulfur-vulcanizable synthetic rubber or the like, or mixtures of these materials, to produce products having desirable characteristics for the production of various articles of manufacture.

Example 6

300 parts of carbon black, the same as that of the preceding example, after removal of HCl by neutralization or evaporation, is dispersed in about 1,000 parts of a polymerizable liquid consisting essentially of about 750 parts of butadiene and 250 parts of styrene, and containing about 60 parts of natural rubber and 45 parts of Sun Oil Company's EE-lengthener (ink lengthener) dissolved therein, by grinding the mixture in a ball mill for about five hours. The mixture thus obtained is emulsified in about 2,000 parts of water containing about 20 parts of sodium oleate, 30 parts of methyl cellulose and 2 parts of potassium cobaltic nitrite or other aquohydroxylo nitrito cobaltate. The emulsion thus obtained is polymerized with agitation under highly elevated pressure in a reaction vessel completely filled by liquid for a sufficient time to produce upon coagulation a rubbery polymer. Upon suitable coagulation, working and vulcanization of the rubbery polymer, with or without mastication, a vulcanized rubbery compound of good properties is obtained.

Example 6a 30 parts of carbon black is treated with a mixture of di(chlorethylenyl) silicon dichloride and methyl butadienyl silicon dichloride at a sufficiently elevated temperature and at reduced pressure to cause vaporization of the silicon halides. After the treatment of the carbon black, the hydrochloric acid formed is neutralized or vaporized and the carbon black thus obtained is dispersed in about 100 parts of chloro-2-butadiene-1,3, containing about 20 parts of rubbery polychloroprene dissolved therein. Dispersion is had by grinding the ingredients together in a ball mill, preferably in the presence of about 2 or 3 parts of ink lengthener or asphalt to facilitate the dispersion. The mixture thus obtained is emulsified in a solution of about .1 part of potassium cobaltinitrite, about 2 parts of sodium oleate in about 20 parts of water, and 80 parts of glycerin, and retained with agitation in a completely filled pressure vessel at 35° C. to 50° C. until polymerization is substantially complete, whereupon a latex of rubbery polymer having the carbon black intimately dispersed therethrough is obtained. The product produced has a more uniform particle size and apparently has a somewhat more uniform distribution of the carbon black in the rubbery polymer than has the product of Example 6.

The monomeric materials of the above example may be substituted by other materials polymerizable to the plastic, solid or rubberlike state. Thus, in Example 6 butadiene may be omitted or substituted in whole or in part by one or more conjugated dienes, such for example as isoprene, chloroprene, dimethyl butadiene-1,3, or mixtures thereof. The styrene may be omitted or substituted in whole or in part by one or more other materials having a single olefin group, including halogenated arylvinyl compounds such as nuclear-substituted mono-, di- and trichloryl or fluoryl styrenes; alkyl- or chloralkyl arylvinyl compounds; acrylates including methyl methacrylate, acrylonitrile and the like. The rubbery polymerizable materials, the compounds formed, and the method of polymerization may be identical with those set forth in my prior application, Serial No. 527,929, filed March 24, 1944, the carbon black in accordance with the present invention treated with organosilicon halides or hydrides being substituted in whole or in part for carbon black set forth in the above prior application.

Example 7

45 parts of carbon black, treated as in Example 3, but with a fluid containing a mixture of di(butadienyl-1,3)-ethyl silicon chloride and butadienyl diethyl silicon chloride in place of the allyl-substituted silicon halide is, after removal of the hydrochloric acid formed during the treatment, masticated into about 100 parts of GR-S, other ordinary compounding and vulcanizing agents being incorporated in the usual way. A tire tread formed from the compound thus obtained has very desirable wear-resistant properties.

The GR-S in the above example may be substituted by other rubber like materials, including natural rubber, Butyl rubber, Perbunan, neoprene, Thiokol and any sulfur-vulcanizable synthetic rubber, etc., and the like to obtain compositions of various properties that are suitable for industrial use.

The carbon black in Examples 5, 6 and 7 may be substituted by carbon black or other pigments as above noted, treated with organosilicon halides having the same or different substituents and having the acid neutralized with alkali or removed. The treated carbon black of Example 6 may advantageously be substituted by the treated black of Example 7 as one or more conjugated double bonds of the butadienyl group facilitate union with polymerizable materials.

Example 8

5 parts of carbon black, previously treated as in Example 1, is dispersed into 100 parts by weight of styrene containing about ½ part of benzoyl peroxide and ½ part of soya lecithin by passing the mixture through a colloid mill. The dispersion thus prepared is then strongly agitated into a mass of water to maintain a suspension (fine droplets of styrene throughout the aqueous phase). The aqueous fluid is maintained in a completely filled vessel under superatmospheric pressure for several hours with said agitation until polymerization of the styrene in suspended form is had. The polystyrene thus produced has an unusual degree of jetness and it is desirable for use as a molding powder and in the preparation of plastic articles, or for solution in the preparation of a coating composition.

Example 9

The styrene in Example 8 is substituted by an equal amount of methyl methacrylate. The water of Example 8 is also substituted by an equal amount of a 1% aqueous solution of polymethyl methacrylamide, other conditions remaining the same. The polymethyl methacrylate thus produced has exceptionally desirable properties.

PREPARATION OF PRINTING INKS AND COATING COMPOSITIONS

Example 10

About 10 parts of carbon black is treated with an organosilicon halide as set forth in any of the preceding examples. It is readily dispersed in a composition consisting of 3 parts of ethyl cellulose, 3 parts of beeswax, and 100 parts of sulfur plasticized with sulfur resin, as set forth in Ellis Patent 2,275,101.

*Example 11*

50 parts of carbon black which is treated with trimethyl silicon chloride as in Example 1 is dispersed into 12 parts of resin varnish, 10 parts of gilsonite varnish, 4 to 5 parts of methylviolet toner solution, 430 parts of new zinc oil (petroleum oil), and about 5 parts of a 25% solution of a mixture consisting of 1 part of barium naphthenate and 3 parts of polyisobutylene (Vistonex) by simply grinding the ingredients together in a ball mill for a relatively short time. The ink obtained has an unusual degree of jetness.

The carbon black in Examples 10 and 11 may be substituted by other pigments or carbon blacks treated with other organosilicon halides to give printing inks of desirable properties, having pigments in an unusual degree of fine dispersion, and selectively wetted by the liquid binding ingredients. The liquefied binding ingredients in the above pigments may be substituted by any other organic base vehicles as is apparent to those skilled in the art.

*Example 12*

About 20 parts of titanium dioxide, previously treated as in Example 1 with a mixture of mono-, di- and trimethyl silicon chloride and neutralized, is dispersed in about 125 parts of a solution of creamy viscosity consisting of an alkyd resin, such as glycerol phthalate or tung oil-modified glycerol phthalate resin, and dissolved in a volatile solvent such as a mixture of xylene and butyl acetate containing a small amount of a high boiling ester, such as dibutyl phthalate, diorthotoluyl phthalate, etc. The dispersion thus obtained is emulsified in about one and one-half times its volume of an aqueous solution containing 3% of gelatin and 3% of ammonium hydroxide. The emulsion thus produced is especially desirable as a coating or coloring composition.

*Example 13*

In a solution of about 25 parts of polystyrene in about 100 parts of a volatile solvent, such as benzene, there is dispersed about 80 parts of lead chromate previously exposed to a dry atmosphere containing a mixture of methyl silicon halides under conditions as set forth in Example 1. The dispersion is produced by subjecting the pigment to a shearing action in the presence of said styrene solution, as in a ball or colloid mill. The dispersion thus produced is emulsified in a 5% aqueous solution of ammonium caseinate to produce a colored coating composition having especially desirable properties.

*Example 14*

When in the preceding examples the treated pigment is dispersed in a viscous aqueous solution of ammonium caseinate or other protective colloid by grinding in a colloid mill, the dispersion thus obtained is thinned with water to a light creamy consistency, and the solution of polystyrene emulsified in the dispersion thus obtained, a coating composition which dries to a relatively impervious film is also had. Apparently the coated pigment, being of an organophilic nature, tends to cause coalescence of the separate globules of the styrene solution.

In the preceding examples, the polymerizable and resinous materials may be substituted by other natural and synthetic resins, solutions thereof, and resin-forming materials, including monomers, polymers or copolymers of one or more of the following ingredients: vinyl acetate, vinyl chloride, vinylidene chloride, acrylic and methacrylic esters and amides, hydrocarbon resins such as coumarone indene resins, as well as ester gum, rosin and the like. The pigments may be substituted by other inorganic pigments, organic or inorganic coloring materials which were previously treated with a silicon halide having one or more of the halogen atoms substituted by an organic radical.

PREPARATION OF SYNTHETIC FIBROUS MATERIALS

The following examples illustrate the preparation of synthetic fibrous materials containing pigments dispersed therein to provide delustering or coloring.

*Example 15*

A rough pasty slurry of about 5 parts of carbon black, previously treated as in Example 1, in 25 parts of a viscose solution suitable for spinning into viscose rayon is ground in a ball mill for about three hours, then diluted with about 100 parts of additional viscose solution and ground for an additional fifteen minutes. Fibers spun from the dispersion thus produced have an unusual degree of jetness.

*Example 16*

4 parts of titanium dioxide, previously treated with a methyl silicon halide utilizing the substantially identical procedure of Example 1 except that titanium dioxide is substituted for carbon black and the pigment thoroughly dried and neutralized after treatment, is dispersed into 150 parts of a molten linear superpolyamide (made by condensing hexamethylene diamine and adipic acid) by grinding the ingredients together under anhydrous conditions in a ball mill maintained at temperatures slightly above the melting point of the polyamide. Filaments drawn from the suspension thus obtained had an absence of undesirable lustre and had high strength.

By utilizing the treated black pigment of Example 15 in place of the titanium dioxide, black fibers are had.

In the above examples the carbon black and titanium dioxide pigments may be substituted by any one or more pigments or coloring materials similarly treated with organic silicon halides as afore-mentioned. The superpolyamide of Example 15 may be substituted by other condensation polymers capable of being drawn into filaments or by supercondensation polymer-forming materials such as any of the polymers and reaction mixes described in any of the Carothers Patents 2,071,250 to 2,071,253, inclusive, 2,130,523 and 2,130,948.

PREPARATION OF FINELY DIVIDED PIGMENTS

The following example illustrates the preparation of finely divided pigments by grinding.

*Example 17*

A weighed amount of cement clinker is incorporated in a mill. .025% of a mixture of mono-, di- and triethyl silicon chlorides is incorporated in the clinker and the mixture ground for two hours. Another batch of the same cement clinker is ground for two hours in the same mill, both batches containing the customary additions of gypsum. The surface area of the ground cement prepared without the addition of the ethyl silicon halide is substantially greater than the cement prepared without such addition when viewed by means of a Klein turbidimeter.

When hydraulic cement clinker or other clinker prepared by burning at high temperature has not been previously subjected to a humid atmosphere at a moderate or low temperature to permit previous adsorption of a small amount of moisture, superior results are had by treating the clinker with a humid atmosphere or with a superheated or even saturated steam, or by incorporating a relatively small amount of water a substantial period prior to the addition of the organosilicon halide, or other silicon halide or polymer thereof which may be used as a grinding aid. In the grinding of hot cement clinker at elevated temperature in a continuous grinding apparatus, steam may be introduced during the early portion of the grinding and a silicon halide introduced in a subsequent and different grinding zone.

For the ethyl silicon halide in the above example, vapor of one or more methyl silicon halides or a non-aqueous liquid comprising one or more silicon chlorides coming within the terms of the afore-mentioned formula may be substituted to provide variations in properties. Alkyl orthosilicates, such as ethyl orthosilicate, may also be used as a grinding aid. Silicon halides are exceedingly effective and only minute quantities may be used—about .001% to .05% is generally preferred, although even smaller quantities have noticeable effect, and larger amounts up to .1% or even .5% may be used, particularly when the organic groups are relatively large. A relatively volatile silicon halide, such as a mixture of methyl silicon halides, appears to be especially effective in organic solids, clinker including gypsum, and raw materials such as limestone, silica, etc. from which hydraulic cements are made.

Liquids or solutions comprising organosilicon polymers, such as the soluble or plastic polymers set forth in one or more of the above-enumerated patents, may also be incorporated with Portland or other hydraulic cement clinker or the like to function as grinding aids. When present in amounts larger than .2% or so, or preferably present in amounts larger than .5%, they have a noticeable effect on waterproofing cement compositions such as mortar or concrete.

The waterproofing of cement and other compositions may also be had by introducing therein an inert powder, such for example as finely divided silica (Silex) or sand that has been treated with any one or more of the reactive organosilicon halides within the general formula above set forth. Such a treated pigment is especially desirable as a waterproofing ingredient for cement in the preparation of concrete or mortar mixes, or for the preparation of other inorganic compound mixes where it is desired to decrease their permeability to water. Thus, a hydraulic cement mortar may be obtained by incorporating with the usual portions of hydraulic cement, such as Portland cement, and fine aggregate, such as sand, say about 10% to 50 or 60% or even more, based on the weight of the cement, of "Silex," fly ash or other inorganic or organic powder or finely divided substance that has been treated by dropping it through an atmosphere consisting essentially of an inert substantially anhydrous gas, such as air or nitrogen, saturated with vapor of one or more methyl or other hydrocarbon silicon halides. The solid ingredients are first mixed dry and the desired amount of water subsequently added. Upon hardening and drying of the hardened mortar, the treated pigment apparently acts to decrease the ease with which water penetrates the capillaries of the material as the mortar has considerably less tendency to absorb water than mortar of the same composition except that the organosilicon compound is not present.

When the above mortar is substituted by a concrete containing a substantial proportion of an organosilicon-treated pigment, the objects made therefrom, after drying, also become less permeable to the passage of water therethrough and are less susceptible to water-absorption. Other organic silicon halides and other finely divided materials may be substituted respectively for the methyl silicon halides and the "Silex" in the above examples, as desired. While the organosilicon-treated pigments are especially desirable for waterproofing hydraulic cement and magnesium oxychloride cement structures, they may be incorporated into other compositions to function in a similar way.

Reactive organosilicon compounds, such as ethyl orthosilicate or compounds obtained by substituting one or more ethoxy groups by hydrocarbon groups, or polymers of these compounds as set forth in Patent 2,371,050, exert a desirable improvement on the flowability of mixtures, especially when present in amounts of around 1 to 5% of the weight of the cement. Cement compositions consisting essentially of acidic colloidal silica, hydraulic cement and polymerization products may be used with water as a grouting composition for solidifying porous masses.

PREPARATION OF COATED FABRICS

The treatment of fibrous materials to be coated with films or layers of rubbery or resinous compositions represents another aspect of the present invention.

It is found that fibrous materials, including woven fabrics of cotton, rayon and even of fibers drawn from super-condensation polymers such as the condensation product of adipic acid and hexamethylene diamine, marketed under the trade name "Nylon," when subjected for only a short interval to vapor of an organic silicon halide, such as one within the general formula above set forth, may be readily coated with a film of resinous material, especially when it is deposited from organic solutions or from dispersions or emulsions of solutions of resinous or rubbery base compositions. Such film has considerably more tendency for uniformity and less tendency for porosity than when applied to untreated fabrics.

When the organic group in the silicon halide is unsaturated, and particularly when it contains conjugated double bonds, a bond may be obtained between unsaturated materials either by polymerization mechanism or through the agency of chemical reagents such as sulfur. Thus, for example, it is found that cross-woven or tire cord fabric of cotton, rayon or the like, treated by exposing it for as little as two or three seconds to a vapor of a hydrocarbon-substituted silicon halide, such for example as a mixture of methyl silicon halides, and subsequently treated with a compounded rubber cement or an aqueous dispersion of compounded rubber latex, forms a film which interlaces with the fibrous material and has a strong tendency for adhesion. When a solution in volatile organic solvent or in monomeric polymerizable material of a resinous polymer, such for instance as a solution of polystyrene, polymethyl methacrylate, polymethyl acrylate, polyvinyl ester, polyamide or other organic polymerization or condensation resinous material, is applied to the surface of the treated fabric and the solvent evaporated or caused to polymerize in situ, a more impermeable coating may be had on the fabric with a minimum film thickness. By substituting a butadienyl silicon halide (which may for example be made by a Grignard synthesis from silicon tetrachloride and chloroprene) or other silicon halide having an unsaturated polymerizable group for the methyl silicon halide above, a direct chemical union between the fibrous material and the polymerizable constituents may be obtained when the thus treated fabric is coated with either a partial polymer of rubbery or resin-forming materials, such as one or more of those hereinbefore set forth, and the polymerization continued by heating or with the aid of chemical reagents. When the treated fabric is coated with a partially condensed organic silicon hydroxy compound and further condensation is had by heating in situ therewith, or when the silicone rubber-forming monomers or partial polymers are disposed in contact with the silicon halide-treated fabric, one may obtain direct union to the fabric base of the silicone rubbery or resinous material that is formed by heating the organo-silicols (preferably in the presence of ethyl borate, etc.).

The term "polymer" is used herein in its generic sense to include copolymers as well as homopolymers.

It is to be understood that variations and modifications of the specific products and processes herein shown and described for purposes of illustration may be made without departing from the spirit of the invention.

What I claim is:

1. A method of making a solid polymeric material containing a pigment therein which comprises forming a mixture of water-immiscible polymerizable liquid containing as a main polymerizable constituent thereof at least one member of the group consisting of the polymerizable conjugated dienes, isoprene, butadiene, dimethyl butadiene and the polymerizable mono-olefinic compounds styrene, nuclearly chlorinated styrene having 1 to 3 chlorine atoms, nuclearly fluorinated styrenes of 1 to 3 fluorine atoms, alkyl arylvinyl compounds, methyl methacrylate and acrylonitrile and a pigment that has an olefinic group attached to at least a portion of the surface thereof through silicon atoms and subjecting said polymerizable olefinic compound of said mixture to a polymerization catalyst and to agitation to cause polymerization while it is distributed as droplets in a continuous phase of water whereby said pigment is retained in particles of the polymeric material produced by polymerization of said olefinic compound, said pigment being one that has been contacted with an organosilicon compound having one to three water hydrolyzable groups and at least one unsaturated aliphatic group attached directly to the silicon atom.

2. A method of making a solid polymeric material which comprises dissolving in a free radical polymerizable olefinic liquid containing constituent thereof at least one member of the group consisting of the polymerizable conjugated dienes, isoprene, butadiene, dimethyl butadiene, and the polymerizable mono-olefinic compounds styrene, nuclearly chlorinated styrene having 1 to 3 chlorine atoms, nuclearly fluorinated styrenes of 1 to 3 fluorine atoms, alkyl arylvinyl compounds, methyl methacrylate and acrylonitrile thickener, which is soluble in the mixture of monomers and which is selected from the group consisting of solid polymers of mono-olefinic compounds and rubbery polymers of conjugated diolefinic compounds, to form a thickened polymerizable liquid, dispersing in said thickened liquid a pigment having adhered to surface portions thereof through silicon atoms hydrocarbon groups in sufficient amount so that the pigment is non-wettable by pure water and distributing the mixture thus formed in a continuous phase of aqueous liquid, and maintaining the mixture in disperse form with agitation until it has polymerized substantially to the solid state whereby globules of polymeric material containing pigment dispersed therein is produced.

3. The method of claim 1 wherein said mixture of polymerizable olefinic compound and pigment is dispersed in water containing a protective colloid before completing the polymerization step, wherein it contains a compatible high polymeric material dissolved therein to thicken it at the time when it is dispersed in aqueous vehicle, and wherein polymerization occurs while dispersed in said aqueous vehicle.

4. The method of claim 1 wherein said mixture of polymerizable olefinic compound and pigment is dispersed in water containing a protective colloid before completing the polymerization step, wherein it contains a compatible high polymeric material dissolved therein to thicken it at the time when it is dispersed in aqueous vehicle, and wherein polymerization occurs while dispersed in said vehicle and in a container substantially completely filled with the liquid.

5. The method of claim 2 wherein the emulsion obtained by distributing the thickened mixture in aqueous liquid is maintained in a closed vessel that is substantially completely filled with liquid emulsion during a major portion of the polymerization thereof, whereby bleeding of monomer from pigment is reduced.

References Cited in the file of this patent

UNITED STATES PATENTS

| | | |
|---|---|---|
| 2,030,739 | Bley | Feb. 11, 1936 |
| 2,258,219 | Rochow | Oct. 7, 1941 |
| 2,306,222 | Patnode | Dec. 22, 1942 |
| 2,352,974 | Rochow | July 4, 1944 |
| 2,377,600 | Barker | June 5, 1945 |
| 2,394,025 | Te Grotenhuis | Feb. 5, 1946 |
| 2,424,853 | Safford | July 29, 1947 |
| 2,452,083 | Te Grotenhuis | Oct. 26, 1948 |